June 18, 1929.  E. A. CONNER  1,717,665
ATTACHMENT FOR STRANDS, ROPES, OR CABLES
Filed Nov. 12, 1926
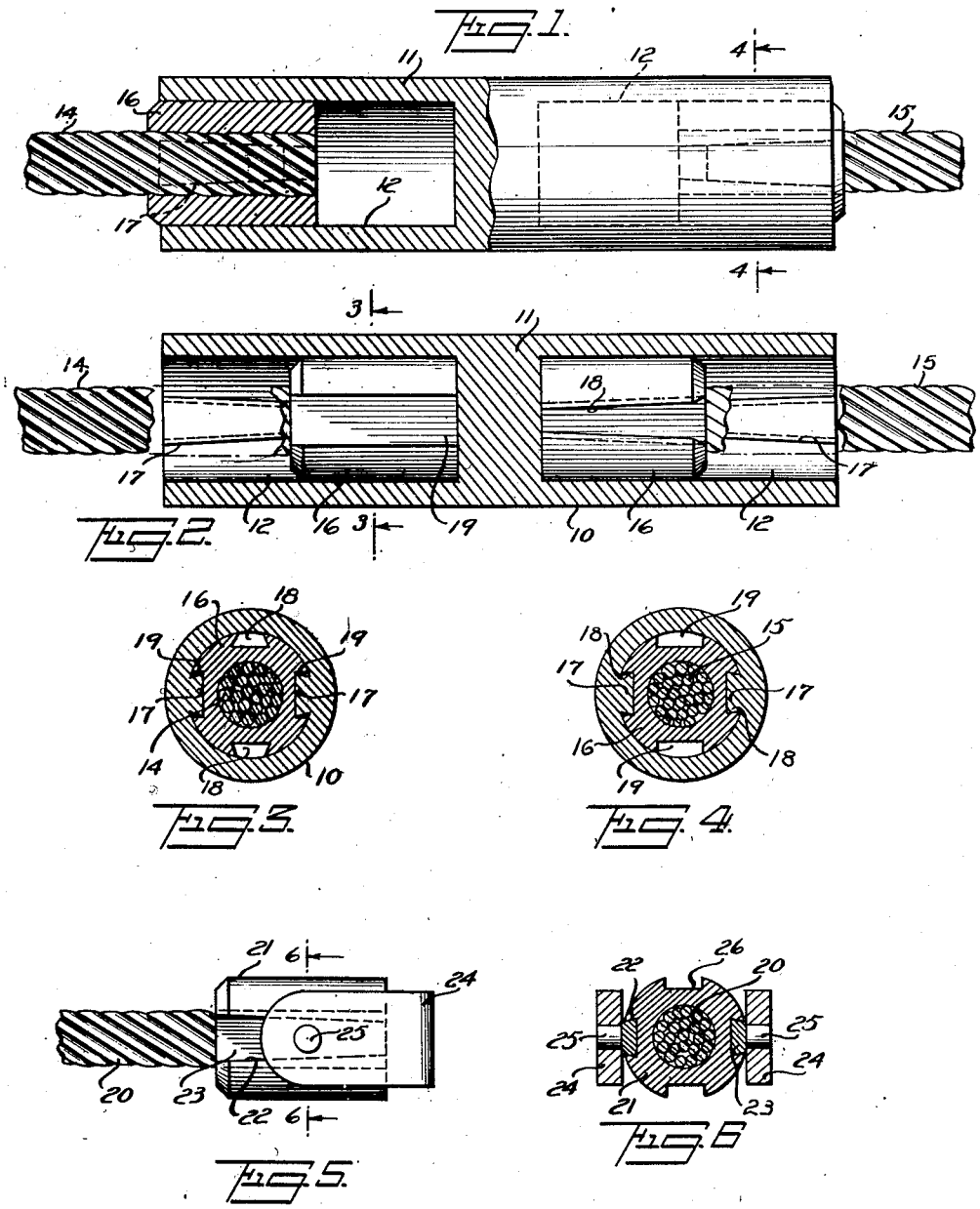
INVENTOR
Edward A. Conner
BY
Frederick P. Duncan, ATTORNEY Patented June 18, 1929.

1,717,665

UNITED STATES PATENT OFFICE.

EDWARD A. CONNER, OF STRATFORD, CONNECTICUT, ASSIGNOR TO AMERICAN CHAIN COMPANY, INC., A CORPORATION OF NEW YORK.

ATTACHMENT FOR STRANDS, ROPES, OR CABLES.

Application filed November 12, 1926. Serial No. 148,087.

This invention relates to improvements in couplings and particularly to an attachment adapted for coupling tension members such as wire strand, rope or cable, etc.

An object of my invention is to provide a very simple and inexpensive coupling which may be readily operated to couple and uncouple a pair of cable ends or the like.

Another object is to provide a coupling device in which tension on the members coupled increases the security of hold of the coupling.

Another object is to provide a coupling which cannot be accidently uncoupled.

Another object is to provide a coupling which will release only upon relieving tension on the members coupled, and then moving them relatively toward each other and turning them through a predetermined angle.

Another object of my invention is to provide a coupling device for coupling a clevis to a tension member.

With these and other objects in view my invention consists in certain novel features of construction and combinations and arrangements of parts as will be more fully hereinafter described and pointed out in the claims.

In the accompanying drawings:

Fig. 1 is a side view, partly in section, of my improved coupling, showing a pair of cable ends coupled together;

Fig. 2 is a view of my coupling in longitudinal section showing a pair of cable ends in the act of being coupled;

Fig. 3 is a view in cross section taken on the line 3—3 of Fig. 2;

Fig. 4 is a view in cross section taken on the line 4—4 of Fig. 1;

Fig. 5 is a view of modified form of my invention showing a cable end coupled to a clevis; and Fig. 6 is a view in cross section taken on the line 6—6 of Fig. 5.

I employ in my coupling a sleeve member 10, which is divided by a central partition 11, to form two open sockets 12, and the ends of two tension members 14 and 15 respectively, which are to be coupled together, are each imbedded in a cylindrical plug 16 of a size to fit said sockets. Formed on the cylindrical wall of each socket is a pair of diametrically opposed dovetailed or undercut tenons 17. Each tenon runs parallel to the axis of the sleeve and extends from the lip or outer end of the socket, to a point which is of slightly greater distance from the central partition 11 than the length of the plug 16. The tenons are also tapered laterally with their wider ends at the lips of the sockets. Each plug is provided in its cylindrical surface with a pair of diametrically opposed dovetailed or undercut grooves 18, which are reversely tapered with respect to the tenons 17, so as to engage and fit said tenons snugly. However, because of their taper the grooves and tenons can be brought into interlocking engagement only by introducing the plugs 16 into the sockets past the inner ends of the tenons and then drawing them outward. To permit of thus introducing the plugs into the sockets each plug 16 is provided with a pair of diametrically opposed grooves 19, preferably located midway between the grooves 18. The grooves 19 have parallel side walls and the width of each groove is slightly greater than the widest portion of the tenons 17. Thus when a plug 16 has been turned to the position shown in Fig. 3, the grooves 19 will clear the tenons 17 and the plug may be introduced into the coupling sleeve. After the plug has been pushed into the socket 12 past the tenons 17 it is turned through an angle of 90 degrees to bring the grooves 18 into registry with the tenons 17. Then on drawing the plug outward the tenons enter the grooves 18 (see Fig. 4) and because of the taper of the tenons the plug will be locked fast to the coupling sleeve.

It is to be understood that instead of coupling together the ends of two tension members as illustrated in Fig. 1, the invention may be embodied in an attachment for a single tension member by applying to the end or an intermediate portion thereof a plug 16 and sleeve part 10 comprising half of the coupling sleeve shown, and the sleeve may be threaded externally or otherwise adapted for any desirable connection with another member to which it may be wished to attach the tension member.

Other modifications may be made, and in Figs. 5 and 6 I show another form of my invention used for coupling a clevis to a tension member. The end of the tension member 20 is embedded in a plug 21 which is very similar in form to the plug 16, having a pair of diametrically opposed taper grooves 22 formed in its cylindrical surface. The grooves 22 are of the same form as the grooves 18, tapering to a narrower width at the free end of the plug 21. To engage the grooves 22, two tapered tenon members 23 are provided, which are similar in form to the tenons 17, but instead of being secured to or forming part of a coupling sleeve 10, are connected to the clevis 24. The clevis 24 consists of a U-shaped member, the ends of which are journaled upon a pair of studs 25 projecting from the outer faces of the tenon members 23.

In operation, the clevis 24 is swiveled on the studs 25 to a position that is substantially normal to the axes of the tenon members 23. This permits of introducing the narrower ends of the tenon members 23 into the wider ends of the grooves 22 in the plug 21, and then by drawing the tenon members outward and swinging the clevis to the position shown in Fig. 5, the coupling of the tension member 20 to the clevis is completed. As long as the clevis 24 extends over the free end of the plug 21, it is impossible to release the plug from the clevis, but whenever desired the clevis may be swung clear of the end of the plug 16, after which the tenon members may be released from the plug by sliding them inward or away from the free end of the plug. The plug 21 may be provided with additional grooves 26 located midway between the grooves 22. This will be found of advantage at times, and particularly when it is desirable to connect or disconnect a clevis without swinging it about its pivots, in which event the clevis will be made long enough to permit an axial movement like that of the sleeve 10, relatively to the plug 16, described with reference to Fig. 1.

Having thus described my invention and with the understanding that various changes and modifications can be made without departing from the spirit and scope of my invention,

I claim:

1. In a coupling of the character described, a plug-member adapted to be secured to an end of a tension member, and a coupling member adapted to receive said plug, one of said members being longitudinally mortised, and said other member being provided with tenons adapted respectively to engage said mortises removably, said tenons and mortises being tapered to wedge together and connect said coupling members against relative axial movement in one direction.

2. In a coupling of the character described, a socket member, and a plug member adapted to fit therein, one of said members being formed with a tenon and the other with a mortise to engage said tenon, said other member being also formed with a groove to clear said tenon, permitting the plug to be introduced into the socket and turned to bring the mortise and tenon into alignment, said mortise and tenon being tapered in such direction as to interlock as the plug member is drawn outward from the socket member.

3. In a coupling of the character described, a member formed with a socket, a tenon formed on a side wall of the socket and extending part way therein, and a plug adapted to be introduced into the socket past the inner end of the tenon, the plug being formed with a mortise groove extending to the outer end thereof and adapted to be interlocked with the tenon by outward movement of the plug with respect to the socket.

4. In a coupling of the character described, a member formed with a socket, a tenon formed on a side wall of the socket and extending part way therein, and a plug formed with a groove to clear the tenon and permit of introducing the plug into the socket past the tenon, the plug being also formed with a groove to fit and interlock with the tenon, the latter groove extending to the outer end of the plug to receive the inner end of the tenon.

5. In a coupling of the character described, a member formed with a socket, a tenon formed on a side wall of the socket and extending part way therein, the tenon tapering to a narrower width at the inner end thereof, and a plug adapted to be introduced into the socket past the inner end of the tenon, the plug being formed with a mortise groove reversely tapered with respect to the tenon and adapted to interlock therewith.

6. In a coupling of the character described, a member formed with a socket, an under-cut tenon formed on a side wall of the socket and extending part way therein, and a plug adapted to be introduced into the socket past the inner end of the tenon, the plug being formed with an under-cut groove extending toward the outer end thereof and adapted to be interlocked with the tenon by outward movement of the plug with respect to the socket.

7. In a coupling of the character described, a member formed with a socket, a tenon formed on a side wall of the socket and extending part way therein, the tenon tapering to a narrower width near the inner end thereof, and a plug adapted to be introduced into the socket past the inner end of the tenon, the plug being formed with a mortise groove reversely tapered with respect to the tenon and adapted to interlock therewith.

8. In a coupling of the character described, a member formed with a socket, a tenon formed on a side wall of the socket and extending part way therein, the tenon tapering to a narrower width near the inner end thereof, and a plug adapted to be introduced into the socket past the inner end of the tenon, the plug being formed with an under-cut groove reversely tapered with respect to the tenon and adapted to interlock therewith.

9. In a coupling of the character described, a sleeve member, a tenon formed on the inner wall of the sleeve member and extending part way therein, and a plug formed with a groove to clear the tenon and permit of introducing the plug into the sleeve member past the tenon, the sleeve member being formed with a transverse wall spaced from the inner end of the tenon a distance slightly greater than the length of the plug, the plug being formed with a mortise to fit the tenon, said mortise extending toward the outer end of the plug to receive the inner end of the tenon.

10. In a coupling of the character described, a plug adapted to be secured to an end of a tension member, said plug being longitudinally mortised on opposite sides thereof, a pair of tenon members adapted respectively to engage the mortised portions of said plug, a coupling member carrying said tenons and embracing said plug when said plug and coupling member are assembled, said tenons and mortises being tapered to interlock as the tenons are drawn outwardly with respect to the tension member.

11. A device of the character described, comprising a plug adapted to be secured to a tension member and formed with a pair of under-cut mortises respectively disposed on opposite sides of the plug, the mortises extending longitudinally of the plug and tapering to a narrower width at the free end of the plug, a pair of tapered tenon members formed to interlock with said mortises, and a U-shaped member connecting said tenon members.

12. A device of the character described, comprising a plug adapted to be secured to a tension member and formed with a pair of under-cut mortises longitudinally disposed on opposite sides of the plug, the mortises tapering to a smaller dimension at the free end of the plug, a pair of tapered tenon members formed to interlock with said mortises, and a U-shaped member pivotally secured to said tenon members.

13. A device of the character described, comprising a plug adapted to be secured to a tension member and formed with a pair of under-cut mortises longitudinally disposed on opposite sides of the plug the mortises tapering to a smaller dimension at the free end of the plug, a pair of tapered tenon members formed to interlock with said mortises, a stud projecting from the outer face of each tenon member, and a U-shaped member spanning the tenons and pivoted on the studs.

14. A device of the character described, comprising a plug adapted to be secured to a tension member and formed with a pair of under-cut mortises longitudinally disposed on opposite sides of the plug, the mortises tapering to a smaller dimension at the free end of the plug, a pair of tapered tenon members formed to interlock with said mortises, a stud projecting from the outer face of each tenon member, and a U-shaped member spanning the tenon members and pivoted on the studs, the outer end of each stud being formed with a head to retain the U-shaped member.

15. A device of the character described, comprising a plug adapted to be secured to a tension member and formed with a pair of under-cut mortises longitudinally disposed on opposite sides of the plug, a pair of tapered tenon members formed to interlock with said mortises, a stud projecting from the outer face of each tenon member, and a U-shaped member spanning the tenon members and pivoted on the studs, the length of the U-shaped member being sufficient to span the ends of the tenon members but with a clearance less than the length of said plug.

In testimony whereof, I have signed this specification.

EDWARD A. CONNER.